(12) United States Patent
Gerami (10) Patent No.: US 10,024,297 B2
(45) Date of Patent: Jul. 17, 2018

(54) RECIPROCATING MOTION ENERGY CONVERSION APPARATUS

(71) Applicant: Cyrus H Gerami, Chicago, IL (US)

(72) Inventor: Cyrus H Gerami, Chicago, IL (US)

( * ) Notice: Subject to any disclaimer, the term of this patent is extended or adjusted under 35 U.S.C. 154(b) by 0 days.

(21) Appl. No.: 14/975,461

(22) Filed: Dec. 18, 2015

(65) Prior Publication Data

US 2016/0177912 A1    Jun. 23, 2016

Related U.S. Application Data

(60) Provisional application No. 62/094,064, filed on Dec. 18, 2014, provisional application No. 62/211,749, (Continued)

(51) Int. Cl.
  *F03B 13/20* (2006.01)
  *F03D 5/06* (2006.01)
  (Continued)

(52) U.S. Cl.
  CPC ............ *F03B 13/20* (2013.01); *F03B 13/185* (2013.01); *F03D 5/06* (2013.01); *F03G 7/08* (2013.01);
  (Continued)

(58) Field of Classification Search
  CPC .......... F03B 13/20; F03B 13/185; F03D 5/06; F03D 9/002; F03G 7/08; Y02E 10/38; Y02E 10/70
  (Continued)

(56) References Cited

U.S. PATENT DOCUMENTS 4,118,932 A * 10/1978 Sivill ...................... F03B 13/20
                                                     417/332
4,170,738 A * 10/1979 Smith ................... F03B 13/185
                                                     185/30
(Continued)

FOREIGN PATENT DOCUMENTS

CN    202231476    5/2012
EP    2759697    7/2014
(Continued)

OTHER PUBLICATIONS

Jayasuriya, Wind Turbine with horizontally pivoted blades, Oct. 7, 2010.
(Continued)

*Primary Examiner* — Viet Nguyen
*Assistant Examiner* — Joseph Ortega (57) ABSTRACT

A reciprocating motion energy conversion apparatus is adapted to capture kinetic energy of wind, waves, or other reciprocating or turbulent motion in order to generate electricity. A rolling shaft rests on a shaft guide frame, with the rolling shaft being coupled to the input shaft of at least one electric generator. As the shaft guide frame tilts or rocks, the rolling shaft rolls on the shaft guide frame, turning the input shaft of the generator and producing electricity. In a Wave rocker embodiment, the shaft guide surface is secured within a buoyant, waterproof enclosure, which is placed in a body of water to convert energy from wave motions. In a Wind board embodiment, the shaft guide frame is suspended from two swing panels, which are put into swinging motion by turbulent winds, causing the rolling shaft to roll and turn the input shaft of each pair of electric generators.

13 Claims, 9 Drawing Sheets

Related U.S. Application Data filed on Aug. 29, 2015, provisional application No. 62/213,618, filed on Sep. 2, 2015.

(51) Int. Cl.
| | |
|---|---|
| *F03D 9/00* | (2016.01) |
| *H02K 7/00* | (2006.01) |
| *H02K 7/06* | (2006.01) |
| *H02S 10/12* | (2014.01) |
| *F03B 13/18* | (2006.01) |
| *F03G 7/08* | (2006.01) |

(52) U.S. Cl.
CPC ........ *H02S 10/12* (2014.12); *F05B 2260/402* (2013.01); *Y02E 10/38* (2013.01); *Y02E 10/70* (2013.01)

(58) Field of Classification Search
USPC .......................................................... 290/42
See application file for complete search history.

(56) References Cited

U.S. PATENT DOCUMENTS

| | | | | |
|---|---|---|---|---|
| 4,173,123 | A * | 11/1979 | Gurtler | F03G 6/06 60/531 |
| 4,184,336 | A * | 1/1980 | Lamberti | F03B 13/186 60/507 |
| 4,256,971 | A * | 3/1981 | Griffith | F03B 13/20 290/42 |
| 6,790,007 | B2 | 9/2004 | Gingras et al. | |
| 6,925,800 | B2 | 8/2005 | Hansen et al. | |
| 7,116,006 | B2 | 10/2006 | McCoin | |
| 7,755,224 | B2 * | 7/2010 | Beane | F03B 13/20 290/42 |
| 7,906,865 | B2 | 3/2011 | Miguela et al. | |
| 7,922,452 | B2 | 4/2011 | Filho | |
| 7,928,594 | B2 | 4/2011 | Shreider et al. | |
| 7,964,984 | B2 | 6/2011 | Saavedra | |
| 8,206,113 | B2 | 6/2012 | Ryynanen et al. | |
| 8,247,912 | B2 | 8/2012 | Pardal et al. | |
| 8,269,365 | B2 | 9/2012 | Clement et al. | |
| 8,278,776 | B1 | 10/2012 | Arntz | |
| 8,373,297 | B2 | 2/2013 | Grigg | |
| 8,702,393 | B2 | 4/2014 | Al-Azzawi | |
| 8,786,121 | B1 | 7/2014 | Peng | |
| 8,807,947 | B1 | 8/2014 | Simnacher | |
| 8,821,120 | B1 | 9/2014 | Pandit | |
| 2007/0137943 | A1 * | 6/2007 | Duclos | F03G 3/06 185/27 |
| 2008/0224472 | A1 * | 9/2008 | Bean | F03B 13/20 290/42 |
| 2009/0072540 | A1 * | 3/2009 | McCague | F03B 13/186 290/53 |
| 2009/0167026 | A1 | 7/2009 | Marvin | |
| 2009/0243305 | A1 * | 10/2009 | Cieslak, Jr. | F03G 7/10 290/1 R |
| 2009/0313988 | A1 * | 12/2009 | Cassagnol | F03B 13/182 60/497 |
| 2010/0025999 | A1 * | 2/2010 | Kim | F03B 13/14 290/53 |
| 2010/0109343 | A1 * | 5/2010 | Lemke | F02B 75/282 290/1 R |
| 2010/0170497 | A1 * | 7/2010 | Glynn | F03G 6/00 126/572 |
| 2010/0180594 | A1 * | 7/2010 | Glynn | F03G 6/00 60/641.15 |
| 2010/0242672 | A1 * | 9/2010 | Gutsche | F03G 3/08 74/84 R |
| 2010/0253082 | A1 * | 10/2010 | Cotto-Rodriguez | F03B 13/06 290/54 |
| 2010/0270810 | A1 * | 10/2010 | Liebermann | B60L 7/06 290/1 A |
| 2010/0283249 | A1 | 11/2010 | Harden | |
| 2010/0295318 | A1 | 11/2010 | Liao | |
| 2010/0300223 | A1 * | 12/2010 | Farb | F03B 13/16 74/35 |
| 2010/0303614 | A1 | 12/2010 | Hector | |
| 2011/0084502 | A1 | 4/2011 | Ghassemi et al. | |
| 2011/0089703 | A1 * | 4/2011 | Kennedy | F03G 7/08 290/1 C |
| 2011/0266801 | A1 * | 11/2011 | Sainio | B60G 13/02 290/48 |
| 2012/0240569 | A1 * | 9/2012 | Padula | F03B 13/1865 60/504 |
| 2012/0269632 | A1 * | 10/2012 | Westergaard | F03D 1/0641 416/159 |
| 2013/0008158 | A1 * | 1/2013 | Hon | F03B 13/1815 60/506 |
| 2013/0039761 | A1 | 2/2013 | Filho | |
| 2013/0140821 | A1 * | 6/2013 | Sapir | F03B 13/16 290/50 |
| 2013/0241206 | A1 * | 9/2013 | Tkadlec | F03B 17/063 290/54 |
| 2014/0132003 | A1 * | 5/2014 | Hayashi | F03B 13/20 290/53 |
| 2015/0123405 | A1 * | 5/2015 | Dudley | H01L 41/125 290/52 |
| 2015/0176565 | A1 * | 6/2015 | Carretero Bueno | F03D 5/06 290/54 |

FOREIGN PATENT DOCUMENTS

| | | |
|---|---|---|
| GB | 2263735 | 4/1993 |
| JP | 2010014105 | 1/2010 |
| WO | WO1987/004496 | 7/1987 |
| WO | WO2011/062506 | 5/2011 |
| WO | WO2011/131188 | 10/2011 |
| WO | WO2014/174327 | 10/2014 |
| WO | WO2015/003229 | 1/2015 |
| WO | WO2015/082638 | 6/2015 |

OTHER PUBLICATIONS

Helkin, Design and Optimization of a Wave Energy Harvester Utilizing a Flywheel Energy Storage System, 2009.
Kelly, A Practical Guide to Free-Energy Devices.
Como, et al, Ocean Wave Energy Harvesting: Off-Shore Overtopping Design, Mar. 1, 2015.

* cited by examiner

RECIPROCATING MOTION ENERGY CONVERSION APPARATUS

The current application claims a priority to the U.S. Provisional Patent application Ser. No. 62/094,064 filed on Dec. 18, 2014, the U.S. Provisional Patent application Ser. No. 62/211,749 filed on Aug. 29, 2015, and the U.S. Provisional Patent application Ser. No. 62/213,618 filed on Sep. 2, 2015.

FIELD OF THE INVENTION

The present invention relates generally to electric generation from reciprocating motions. More particularly, the present invention relates to energy conversion from reciprocating motion of ocean and sea waves, and turbulent winds.

BACKGROUND OF THE INVENTION

The adverse effects of fossil fuels on our health and environment, plus everyday realities of geopolitical turmoil and unpredictability of energy resources, coupled with long term impact of global warming and climate change, calls for drastic measures in how countries around the globe manage their approach to energy production and distribution.

Production and access to clean energy is vital to the future of our planet. Among the sources of clean energy are wind and wave. Despite the major advances in related technologies in the recent past, we are still faced with many limitations and challenges to fulfill our ever-growing energy demands. To compete economically against carbon-based fossil fuel industries, we need more innovative and affordable ways to harness the power of sun, wind and wave, among other renewable resources.

To reduce the costs associated with installation, production, transmission, operation and maintenance of renewable energy ecosystems, the solutions must be scalable, adaptable, simple and affordable for mass production. It is also critically important to be able to utilize these technologies near the points of use, namely urban and coastal areas, as opposed to far off distant farms and off-shore platforms.

It is therefore an objective of the present invention to provide alternative energy conversion apparatus and innovative methods to generate electricity by capturing the kinetic energy of wind and wave at relatively adaptable and scalable levels, that are suitable for installation near urban areas and ocean coastlines where electric energy is mostly used.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to avoid unnecessarily obscuring focus of the invention.

The present invention is a reciprocating motion energy conversion apparatus. The primary intent of the present invention is to capture various types of reciprocating motion in order to generate electricity. This is accomplished through a shaft rolling back and forth on a guide frame as the guide frame rocks back and forth, with the shaft being directly coupled with electric generators' input shafts, thus converting the rotational motion of the shaft into electrical energy. Various preferred embodiments of the present invention are able to convert kinetic energy from ocean and sea waves and turbulent winds.

The same apparatus can also be adapted and utilized in vehicles and objects with sudden and frequent stops. The kinetic inertia of such vehicles can be store and converted to other forms of energy after each sudden and frequent stop. For example, when the apparatus is used in vehicles such as urban trucks and buses, it can partly reclaim the energy that would be otherwise wasted as heat in vehicle brakes.

Referring to FIGS. 1-5, the preferred embodiment of the present invention generally comprises at least one shaft guide frame 1, at least one power generator 2, and at least one rolling shaft 3. It should be understood that one or more shaft guide frames 1, electric generators, or rolling shafts 3 may be utilized in various embodiments or applications. Either one rolling shaft 3 may be utilized, or two or more rolling shafts 3 performing the same function, or two or more shaft guide frames 1 working together to support one or more rolling shafts 3, or other combinations. These, however, are examples of implementation details and do not profoundly alter the fundamental components and structure of the present invention. For the sake of simplicity and clarity, the preferred embodiment of the present invention is assumed to comprise a single shaft guide frame 1 and a single rolling shaft 3. However, the present invention is not being limited to the aforementioned embodiment. In the preferred embodiment of the present invention, each power generator 2 comprises a first electric generator 21 and a second electric generator 22. However, in alternate embodiments the power generator 2 may comprise a single electric generator.

The shaft guide frame 1 is the structural component of the present invention upon which the rolling shaft 3 rests. The shaft guide frame 1 may be made of any suitable lightweight material for facilitating the purpose of supporting the rolling shaft 3. Each shaft guide frame 1 comprises a shaft guide surface 10, a first guide frame end 11 and a second guide frame end 12. The shaft guide surface 10 is a top surface of the shaft guide frame 1 which supports the rolling shaft 3. The shaft guide surface 10 is connected between the first guide frame end 11 and the second guide frame end 12. The first guide frame end 11 and the second guide frame end 12 are boundaries of the shaft guide frame 1 between which the rolling shaft 3 is constrained.

The rolling shaft 3 may be any type of shaft that is able to roll back and forth atop the shaft guide frame 1. The rolling shaft 3 may be made of any suitable material that facilitates the operation and purpose of the present invention. Each rolling shaft 3 is positioned on the shaft guide surface 10 of at least one of the shaft guide frames 1 between the first guide frame end 11 and the second guide frame end 12. Each rolling shaft 3 is able to roll freely in both directions on the shaft guide surface 10 of at least one shaft guide frame 1 between the first guide frame end 11 and the second guide frame end 12 (said directions being: toward the first guide frame end 11, which is the same as away from the second guide frame end 12, and toward the second guide frame end 12, which is the same as away from the first guide frame end 11).

Figure 7:
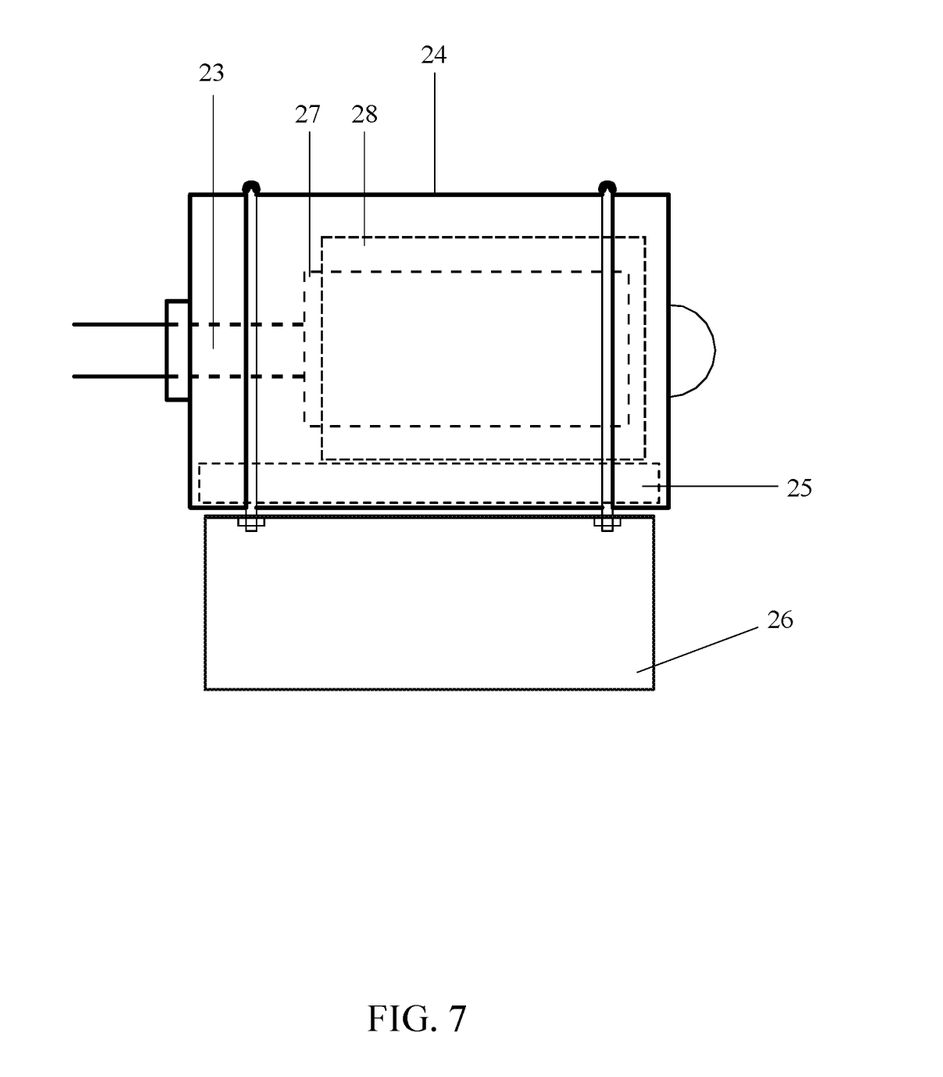
FIG. 7 is an internal view of an electric generator utilized in the present invention.

As shown in FIG. 7, each electric generator comprises a generator housing 24 and an input shaft 23. The input shaft 23 is concentrically connected to a rotor of the electric generator within the generator stator and housing. Rotation of the input shaft 23 and thus the rotor 27 relative to a stator 28 within the electric generator results in the generation of electricity. Each electric generator is positioned such that the input shaft 23 of each electric generator is concentrically coupled to a rolling shaft 3.

In the preferred embodiment of the present invention, the input shaft 23 and the rolling shaft 3 are directly coupled, without utilizing any additional coupling mechanism or components such as gears, pulleys, belts, or other means to couple the rotation of the rolling shaft 3 with the rotation of the input shaft 23. This is considered one of the most direct and efficient methods of conversion of kinetic energy to electric energy.

The generator housing 24 of each electric generator is angularly restrained against rotation about the input shaft 23. This is to ensure that the input shaft 23 is able to properly rotate within the stator and generate electricity. One means of restraining the generator housing 24 of each electric generator is described later, utilizing restrainer wheels 67. Another means of restraining the generator housing 24 against rotation is to simply use weight due to gravity. In this case, each electric generator comprises a weighted portion 25, and the weighted portion 25 is connected to a lower portion of the generator housing 24. The weighted portion 25 restrains the generator housing 24 in a level orientation by applying a torque to the generator housing 24 due to the gravitational force of the weighted portion 25 if the generator housing 24 is not in the level orientation. The weighted portion 25 may simply take the form of a weighted block 26 being suspended from the generator housing 24, or may even be integrally constructed with the electric generator housing 24. In addition, the weight block portions that are used as the restrainer could comprise other functional components of the apparatus such as, but not limited to, the batteries.

It is important to note that the generator housing 24 is not anchored to any fixed object such as the shaft guide frame 1 or the enclosure 61, and is coupled with the rolling shaft 3 and moves along the shaft guide surface 10 as it generates electric energy.

In one embodiment, the shaft guide surface 10 is longitudinally concave between the first guide frame end 11 and the second guide frame end 12. The longitudinal direction is defined as between the first guide frame end 11 and the second guide frame end 12, or the direction the rolling guide shaft will travel as it rolls along the shaft guide surface 10. In another embodiment, the shaft guide surface 10 is partially or fully flat in the center portion. The radius of concave surface of the shaft guides in general is determined based on number of factors, including the distance and position of the pivot axis 72 relative to the shaft guide surface 10.

In one preferred embodiment of the present invention, the power generator 2 comprises a first electric generator 21 and a second electric generator 22. The input shaft 23 of the first electric generator 21 is concentrically coupled to the first axial end 31 of an indicated rolling shaft 3, or simply to the first axial end 31 of the rolling shaft 3, if only one rolling shaft 3 is utilized. The input shaft 23 of the second electric generator 22 is similarly concentrically coupled to a second axial end 32 of the indicated rolling shaft 3 opposite the first electric generator 21, thus maximizing the electricity generation potential of the rolling shaft 3. Simply stated, the input shafts of a pair of electric generators are concentrically coupled with each other utilizing a common rolling shaft 3 and saddled over the rolling shaft guide surface 10.

Figure 1:
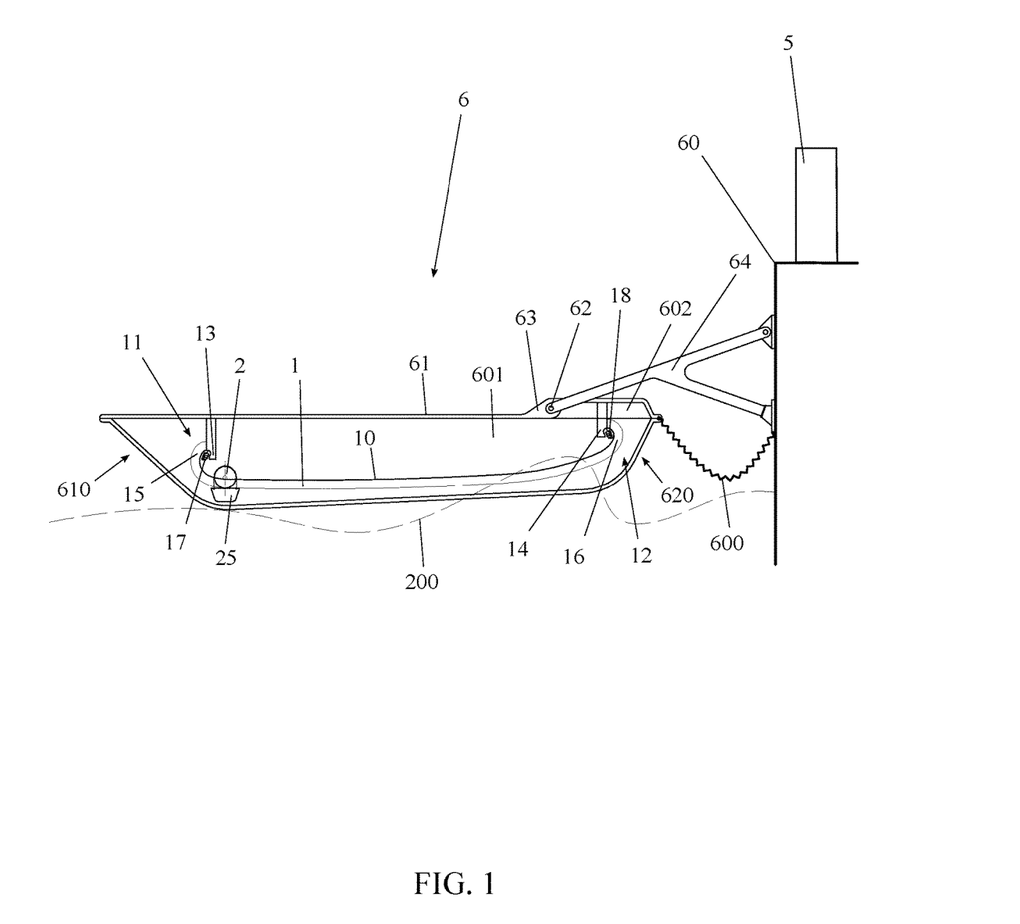
FIG. 1 is a side sectional view of the Wave Rocker embodiment of the present invention.

Each of the electric generators is electrically connected to at least one electrical energy receiving device 5, as shown in FIG. 1—thus, the energy generated by each of the electric generators is transmitted to at least one electrical energy receiving device 5. The electrical receiving devices comprise any device which can transmit, modify or utilize the electrical power generated by each of the electric generators. Examples of such devices include, but are not limited to various combination of electrical energy transmitting devices such as electrical wires, cables, electric bridge rectifiers devices, voltage and current regulating devices, capacitors, power aggregating devices, power consuming devices, power storing devices such as batteries, or combination of these devices to transmit and deliver stable and regulated electric voltage and current for local consumption or delivery to an electrical grid network.

The present invention comprises two preferred embodiments to be known and referred to as a "Wave rocker" 6 embodiment and "Wind board" 7 embodiment.

The first preferred embodiment of the present invention is the Wave rocker 6, shown in FIGS. 1-4. The embodiment described and indicated above is adapted as a Wave rocker 6 for use in capturing the reciprocating or turbulent kinetic energy of body of water such as ocean and sea waves in order to generate electricity.

The Wave rocker 6 enclosure 61 comprises a container section 601 and at least one access top cover component 602 to provide a totally enclosed waterproof and buoyant embodiment. The enclosure 61 is made of extremely lightweight materials and components to facilitate buoyancy and easy oscillation caused by minimal wave forces. Preferably the enclosure 61 is pressurized with nitrogen gas to minimize oxidation and corrosion of components within.

The Wave rocker 6 embodiment further comprises at least one shaft guide frame 1 that is mounted within the enclosure 61, at least one power generator 2, and at least one rolling shaft 3 that are directly coupled as indicated and described above, and positioned on the shaft guide surface 10 and restrained within the enclosure 61. Thus, as the enclosure 61 rocks longitudinally up and down with the cycles of ocean waves, so does each shaft guide frame 1 creating oscillating inclined surfaces upon which rolling shafts 3 roll and generate electric energy within electric generators.

The Wave rocker 6 further comprises a stationary pivot axis bar 62 and supporting frame 63.

The supporting frame 63 connects the shaft guide frames 1 and enclosure 61 to the stationary pivot axis bar 62 wherein the pivot axis bar 62 is oriented laterally relative to the shaft guide surface 10. The shaft guide frames 1 may be connected to the stationary pivot axis 72 directly, or indirectly through the enclosure 61.

The Wave rocker 6 further comprises a plurality of anchor supports 64 and lateral bracing members that are attached to a fixed platform structure 60.

The anchor supports 64 secure the pivot axis bar 62 to the fixed platform structure 60, utilizing low friction bearings and other means, allowing the embodiment to freely rotate and oscillate about the stationary pivot axis bar 62.

The shape of the Wave rocker 6 enclosure 61 is configured to maximize the absorption of wave energy impact on the front end 610 and rear end 620 of the enclosure 61, and diffuse the absorption of wave energy impact on the left side 630 and right side 640 of the enclosure 61 during each cycle of rocking motion.

Counterbalance weight blocks are positioned within the enclosure 61 to properly distribute the weight of the enclosure 61 relative the pivot axial bar for optimum oscillations.

Figure 2:
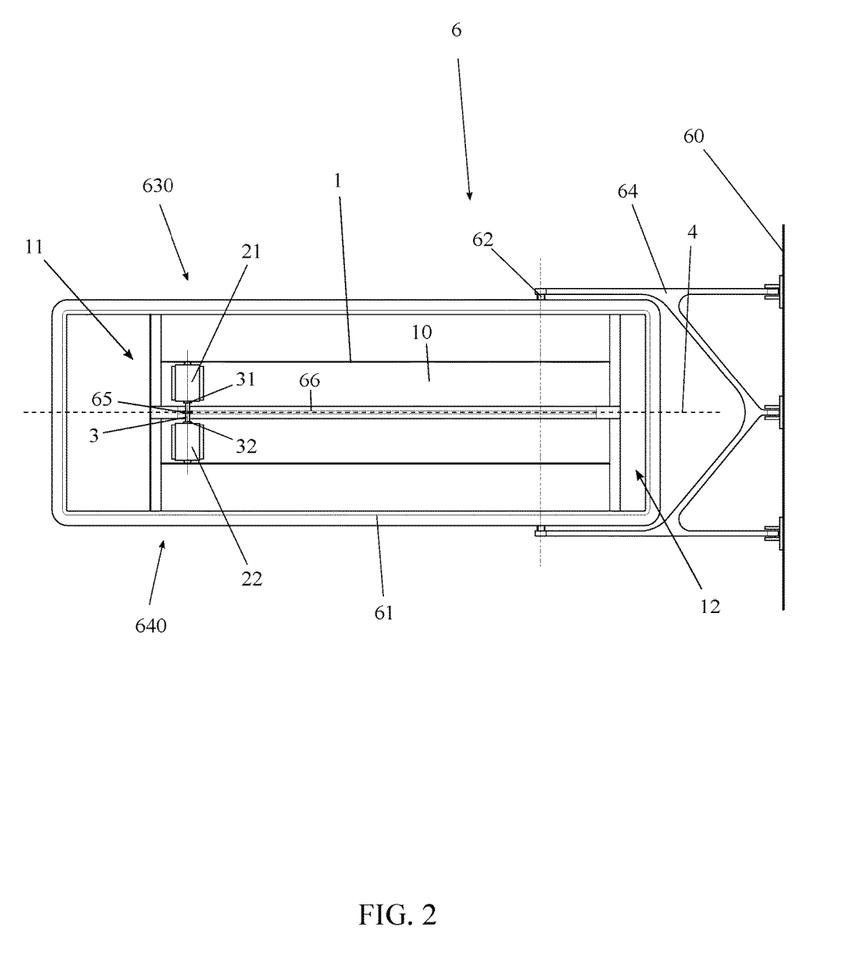
FIG. 2 is a top plan view of the Wave Rocker embodiment of the present invention.
Figure 3:
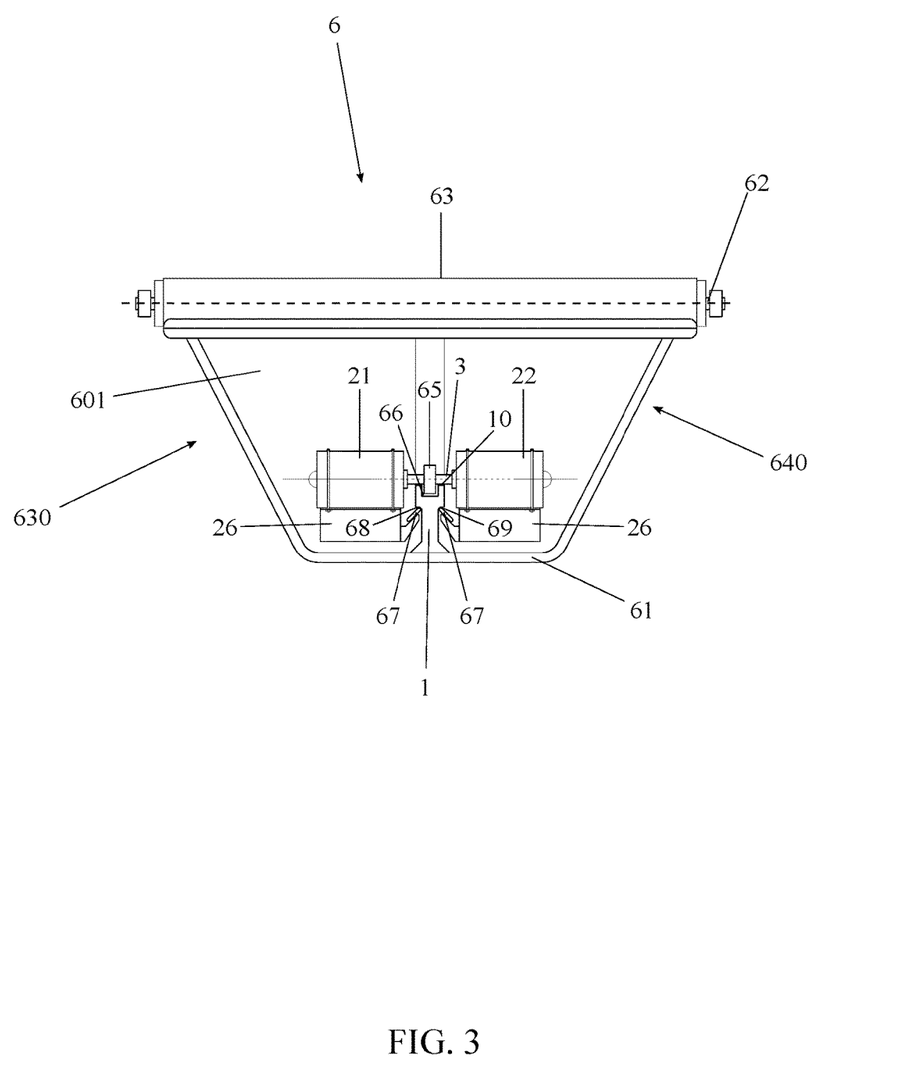
FIG. 3 is an end sectional view of the Wave Rocker embodiment of the present invention.
Figure 4:
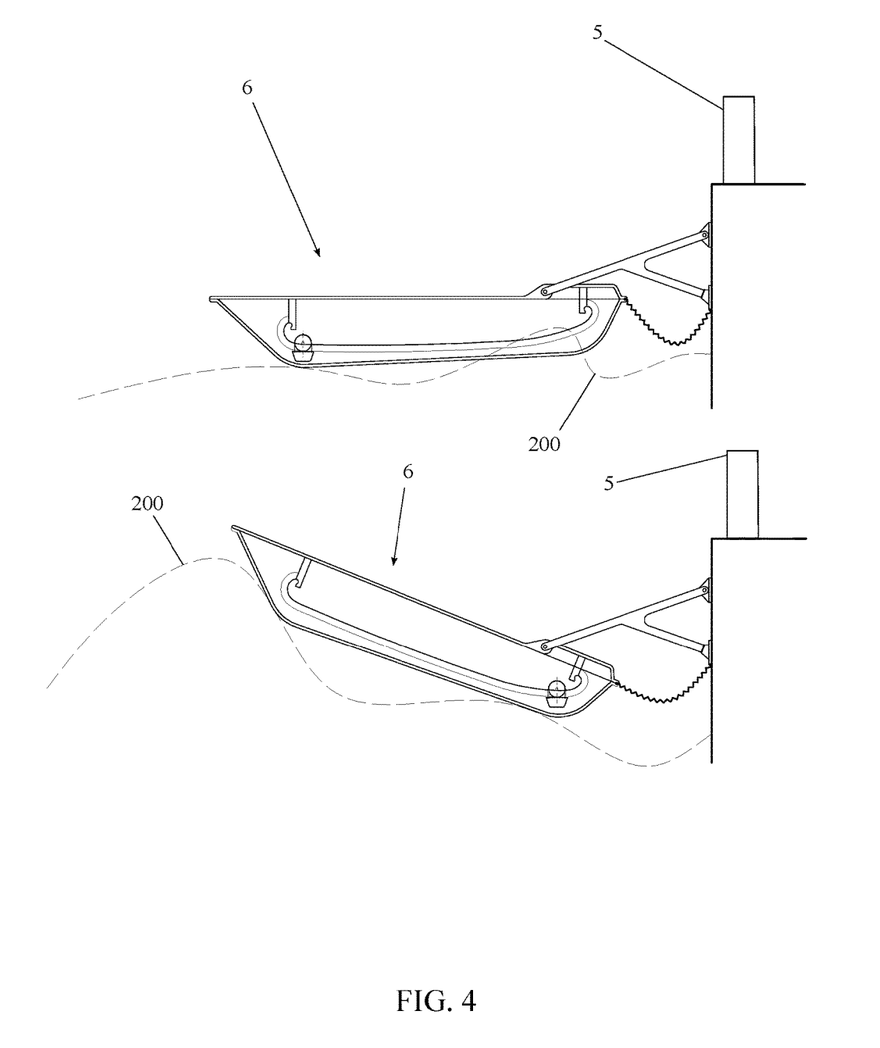
FIG. 4 is a side sectional view showing the rocking action of the Wave Rocker embodiment of the present invention.

Safety mechanisms such as restrainer cords 600 and locking latches connect and secure the Wave rocker 6 enclosure 61 to the fixed platform structure 60 in order to limit its range of oscillation and lateral movement against excessive forces of storms and tidal waves. The restrainer cord(s) 600 primarily function to restrain the Wave Rocker against over-rotating. Referring to FIGS. 2-3, one optional variation of the Wave rocker 6 embodiment comprises at least one shaft guide gear 65. In this embodiment, each shaft guide frame 1 further comprises a shaft guide groove 66. Each shaft guide groove 66 traverses into the shaft guide surface 10 and traverses across the shaft guide surface 10 from the first guide frame end 11 to the second guide frame end 12 along the longitudinal direction. Each rolling shaft 3 is concentrically connected to one of the shaft guide gears 65. Each shaft guide gear 65 is positioned within the shaft guide groove 66 or a corresponding shaft guide groove 66, wherein the shaft guide gear 65 is able to roll between the first guide frame end 11 and the second guide frame end 12 within the shaft guide groove 66, thus securing the rolling shaft 3 in place against lateral motion. Each shaft guide groove 66 is oriented along a longitudinal direction 4 of one of the shaft guide frames 1, wherein the first guide frame end 11 and the second guide frame end 12 are positioned opposite each other along the longitudinal direction 4.

Each shaft guide frame 1 further comprises a first shaft stopper 13 and a second shaft stopper 14, which are positioned opposite each other on each shaft guide frame 1. The first shaft stopper 13 is connected to the first guide frame end 11 of the at least one shaft guide frame 1 adjacent to the shaft guide surface 10, and the second shaft stopper 14 is connected to the second guide frame end 12 of the at least one shaft guide frame 1 adjacent to the shaft guide surface 10. The first shaft stopper 13 and the second shaft stopper 14 may be any object or component which is capable of blocking the rolling shaft 3 from rolling off the ends of the shaft guide surface 10. Thus, the shaft guide surface 10 further comprises first curved portion 15 and a second curved portion 16, wherein the first curved portion 15 curve upwards adjacent to the first guide frame end 11 and the second guide frame end 12, respectively. The first curved portion 15 is positioned adjacent to the first shaft stopper 13 and the second curved portion 16 is positioned adjacent to the second shaft stopper 14. The first and second curved portion 16s curve upwards, away from the shaft guide surface 10, wherein the radius of the shaft guide surface 10 decreases drastically at each end, terminating in an overhanging hooked portion, which is the shaft stopper. The curved portions are between the shaft stoppers and the shaft guide surface 10.

Furthermore, at least one first elastic shock absorber 17 and at least one second elastic shock absorber 18 are utilized to protect the rolling shaft 3 from violent contact with the first shaft stopper 13 and second shaft stopper 14. Each of the first elastic shock absorbers 17 is connected to the first shaft stopper 13 adjacent to the shaft guide surface 10. Similarly, each of the second elastic shock absorbers 18 is connected to the second shaft stopper 14 adjacent to the shaft guide surface 10. The elastic shock absorbers may take the form of any object which is capable of absorbing some of the motion of the rolling shaft 3 upon coming into contact with it, such as, but not limited to, a spring or springs.

Referring to FIGS. 2-3, in one preferred version of the Wave rocker 6 embodiment, each power generator 2 comprises a first electric generator 21 and a second electric generator 22, and each shaft guide frame 1 comprises a first electric generator guide groove 68 and a second electric generator guide groove 69. The first electric generator 21 and the second electric generator 22 also each comprise at least one restrainer wheel 67.

The restrainer wheels 67 and guide grooves of this embodiment function to restrain the first electric generator 21 housing and the second electric generator 22 housing in a level orientation relative to the guide surface, and restrain the generator housing 24 of first electric generator 21 and of the second electric generator 22 from rotating about the input shaft 23. Thus, as the rolling shaft 3 rolls back and forth on the shaft guide surface 10, only the input shaft 23 of the first 21 and second electric generators 22 rotate, and not the generator housing 24 of the first 21 and second electric generators 22 in order to generate electricity.

The first electric generator guide groove 68 and the second electric generator guide groove 69 of each shaft guide frame 1 traverses from the first guide frame end 11 to the second guide frame end 12 on an underside of the shaft guide frame 1 opposite the shaft guide surface 10. The first electric generator guide groove 68 and the second electric generator guide groove 69 of each shaft guide frame 1 are positioned opposite each other about the longitudinal direction 4 of the shaft guide frame 1. Each restrainer wheel 67 of the first electric generator 21 is positioned into the first electric generator guide groove 68, so that each restrainer wheel 67 of the first electric generator 21 is able to roll along the first electric generator guide groove 68 between the first guide frame end 11 and the second guide frame end 12. Similarly, each restrainer wheel 67 of the second electric generator 22 is positioned into the second electric generator guide groove 69, so that each restrainer wheel 67 of the second electric generator 22 is able to roll along the second electric generator guide groove 69 between the first guide frame end 11 and the second guide frame end 12. The restrainer wheels 67 are utilized to maintain the assembly of the electric power generators 2 in place relative to the shaft guide frame 1 during abrupt and erratic motions caused by storms and inclement weather.

Figure 8:
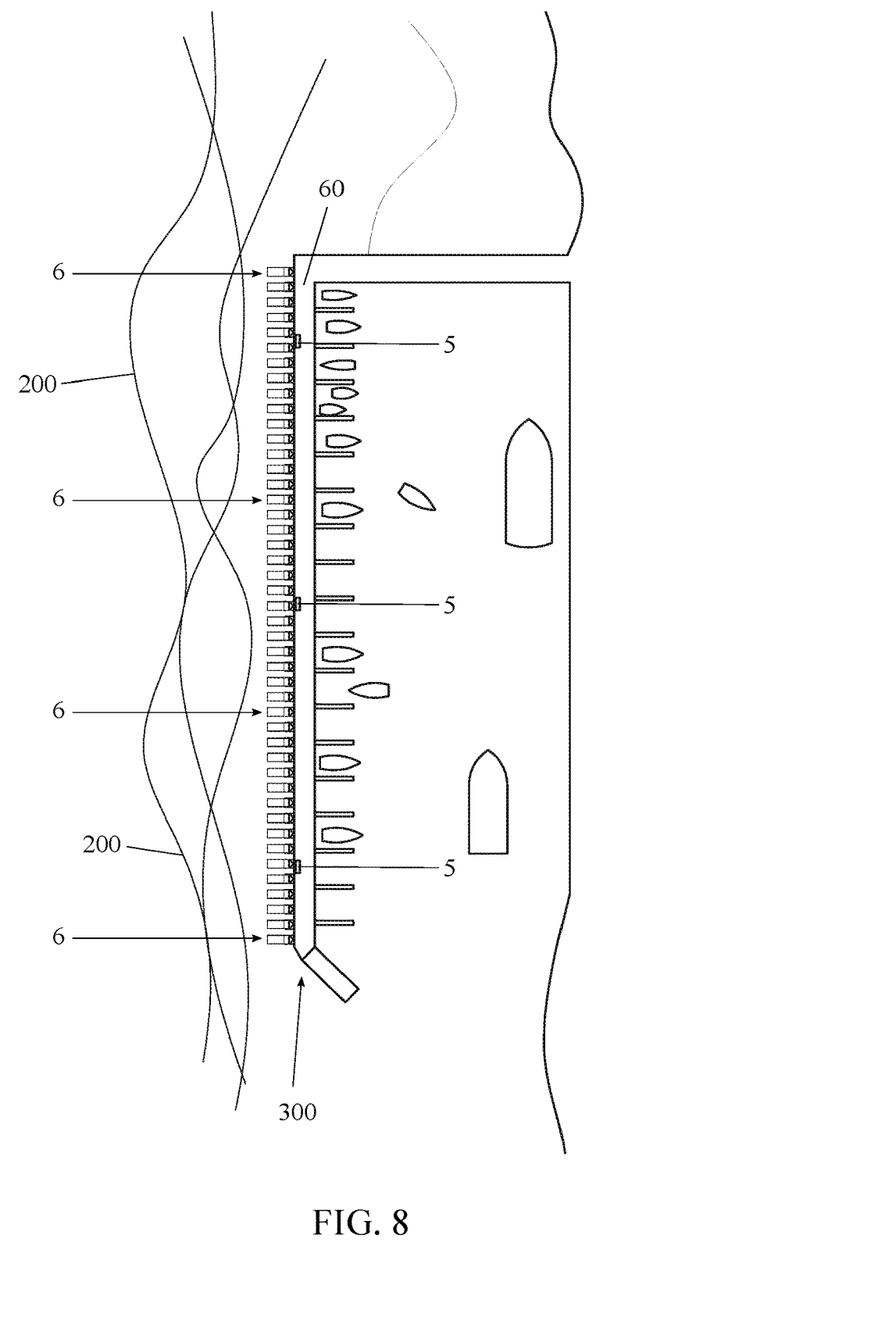
FIG. 8 is an illustration showing multiple Wave Rocker embodiments of the present invention arranged linearly along a coastline.

A preferred method of installing Wave rocker 6 embodiment is to take advantage of breakwater 300 structures in coastlines shallow waters at harbors and ports as the fixed structural platform, as shown in FIG. 8. Multiple small scale Wave rockers 6 can be installed side by side along the breakwater 300 structures facing towards the incoming waves. Harbor breakwater 300 lineup installation is an ideal arrangement for scalable installation. It also provides ease of access, maintenance and common electric transmission infrastructure. Each Wave rocker 6 can be individually installed for operation and isolated for repairs without affecting the entire line up. Another important benefit of the lineup installation is the ability of the individual units in the lineup to function collectively as breakwater 300 and improve the performance and safety of the existing breakwater 300 structures. This arrangement is also aesthetically acceptable as the installation is not readily visible from the shoreline.

Figure 9:
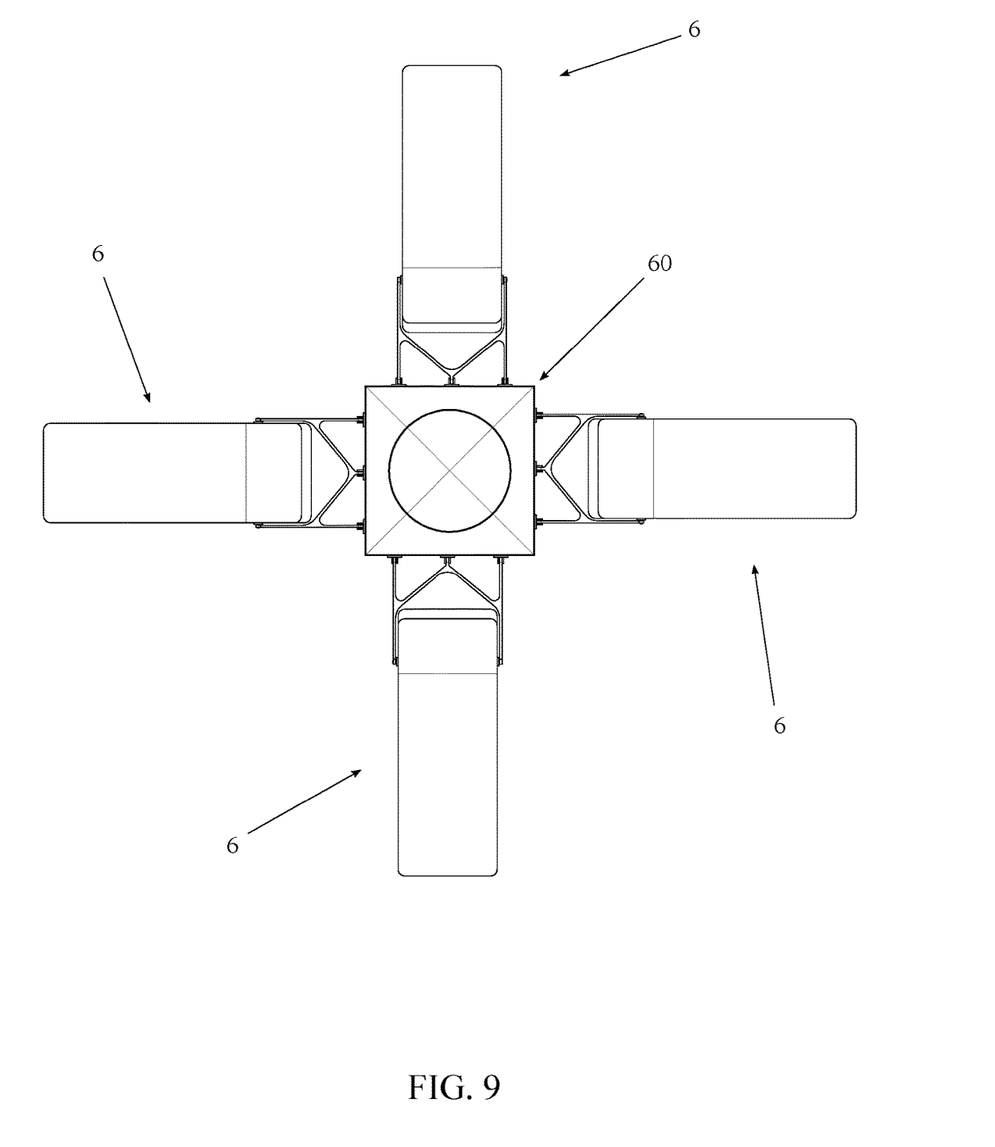
FIG. 9 is an illustration showing multiple Wave Rocker embodiments of the present invention being radially arranged around a platform structure.

As shown in FIG. 9, another preferred method of installing Wave rocker 6 embodiment is to take advantage of structural base of conventional off-shore structures and wind turbines as the fixed structural platforms. Three or more Wave rockers 6 can be structurally attached to the base in a radial formation around the base to interact with waves from all directions.

Other major benefits of the Wave rocker 6 installation along coastlines breakwater 300 structures is that Wave rockers 6 are environmentally friendly to marine life and fishing industry. There is no need for underwater structures, mooring cables and other auxiliary components that can interfere with marine life and fishing activities.

Figure 5:
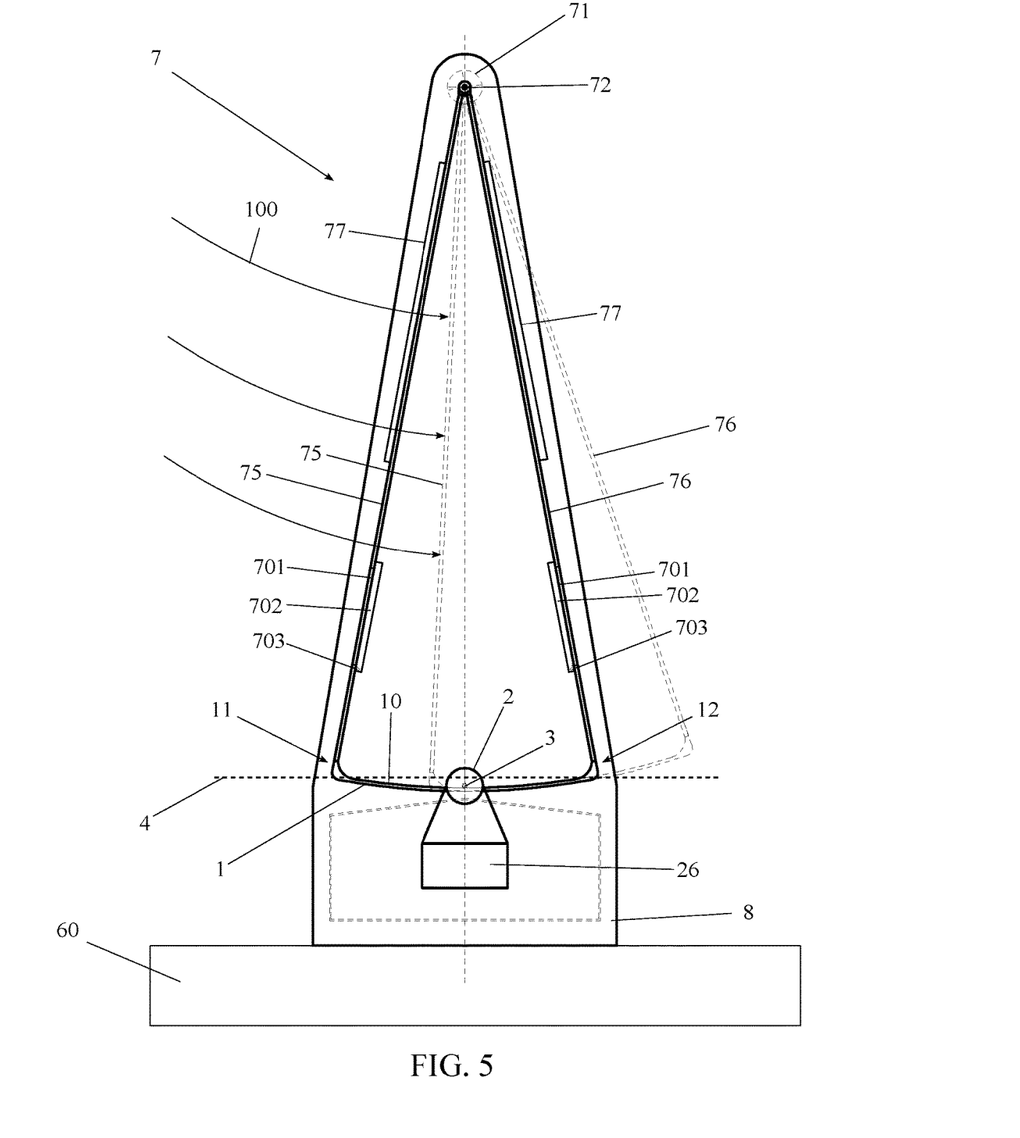
FIG. 5 is an end view showing the rocking action of the Wind Board embodiment of the present invention.
Figure 6:
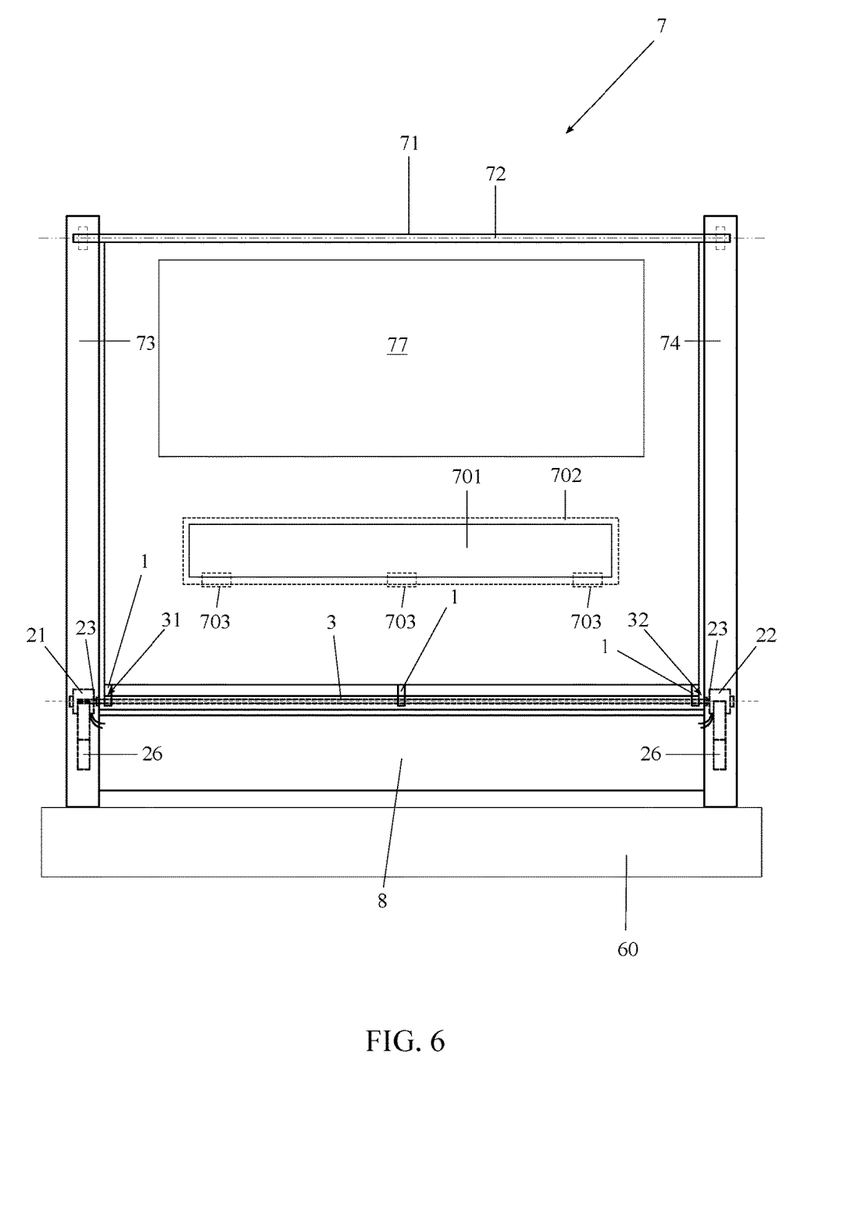
FIG. 6 is a side view of the Wind Board embodiment of the present invention.

The second preferred embodiment of the present invention is a "Wind board 7" embodiment, shown in FIGS. 5-6. The embodiment indicated and described above is adapted as Wind board 7 for use in capturing the turbulent kinetic energy of wind in order to generate electricity. The Wind board 7 is intended to be utilized in any area where turbulent and intermittent winds occurs, though some applications may be more suited to the present invention than others. FIG. 5 demonstrates the rocking action of the Wind Board 7 being pushed by wind 100.

The Wind board 7 embodiment comprises a top bar 71, a first side support 73, and a second side support 74. The top bar 71 comprises a pivot axis 72. Each shaft guide further comprises a first wind swing panel 75 and a second wind swing panel 76, wherein in this embodiment the shaft guide frame 1 is a wind swing panel frame, and wherein the shaft guide frame 1 rotates about the pivot axis 72. The first side support 73 is perpendicularly connected to the top bar 71, and the second side support 74 is perpendicularly connected to the top bar 71 opposite the first side support 73 along the top bar 71. It is contemplated that the perpendicular orientation of the first side support 73 and the second side support 74 is not critical to the structure or functionality of the wind board 7 embodiment, and may be connected at other angles or orientations so long as the top bar 71 and other structural elements are properly supported in position.

Each shaft guide frame 1 is positioned between the first side support 73 and the second side support 74, wherein each shaft guide frame 1 is suspended from the top bar 71. The first wind swing panel 75 is connected between the top bar 71 and the first guide frame end 11 of the shaft guide surface 10, and the second wind swing panel 76 is connected between the top bar 71 and the second guide frame end 12 of the shaft guide surface 10.

In the preferred Wind board 7 embodiment of the present invention, the first wind swing panel 75 and the second wind swing panel 76 each comprise at least one opening 701 and at least one pressure relief flap 702, with each pressure relief flap 702 being layered adjacent to one of the openings 701. Preferably, each pressure relief flap 702 of the first wind swing panel 75 and of the second wind swing panel 76 is secured to the first wind swing panel 75 and the second wind swing panel 76, respectively, by at least one magnetic fastener pair 703, wherein the magnetic fastener pair 703 comprises at least two ferromagnetic materials such as magnetic strips, with at least one of the ferromagnetic materials being magnetized. A first ferromagnetic material from each of the magnetic fastener pairs 703 is connected to a respective swing panel, and a second ferromagnetic material from each of the magnetic fastener pairs 703 is connected to a respective pressure relief flap 702, wherein the first ferromagnetic material and the second ferromagnetic material form the magnetic fastener pair 703 securing the respective pressure relief flap 702 to the respective swing panel. The size of flaps and the strength of the magnetic fasteners are determined based on the size and arrangement of the wind swing panels. The flaps open when wind pressure exceeds the predetermined level to relieve the excess wind pressure for safety during strong wind conditions and storms.

Another preferable, but optional feature for the wind board 7 embodiment is a photovoltaic panel 77. The photovoltaic panel 77 may be connected to the first wind swing panel 75, or the photovoltaic panel 77 may be connected to the second wind swing panel 76, or both. The photovoltaic panels 77 are generally oriented towards south, southeast or southwest orientations. In these arrangement, the wind swing panels of the embodiment provide a dual functionality of capturing wind energy as well as solar energy. Although the angle of the wind swing panels are substantially vertical and conceivably not most efficient for collection of solar energy, the substantially vertical panels provide other benefits as compared to photovoltaic panels 77 that are installed substantially horizontal or slightly inclined. The substantially vertical panels are less prone to accumulation of dirt and snow and are relatively more efficient as the installation site is farther from earth's equator. Furthermore the southeast and southwest facing photovoltaic panels 77 are also more efficient when installed in substantially vertical positions.

The Wind board 7 embodiment preferably also comprises a base enclosure 8. The base enclosure 8 is positioned adjacent to the shaft guide frame(s) 1 opposite the top bar 71, and the base enclosure 8 is connected between the first side support 73 and the second side support 74, and is anchored to a fixed platform structure 60.

The Wind board 7 embodiment preferably also comprises optional components such as shaft stoppers, safety restrainer wheels 67, safety restrainer cords 600 and locking mechanisms, similar to the ones indicated for the Wave rocker 6 embodiment, for secure installation and safe operation of the Wind board 7 during inclement weather conditions.

A preferred method of installing Wind board 7 embodiment is to use the assembly as a multi-functional device with other applications such as rooftop solar panels, bill boards and privacy and security screens.

Another preferred method of installing Wind board 7 comprises three or more Wind board 7 embodiments to be installed in a radial formation to interact with turbulent wind streams from all directions.

In addition to Wave rocker 6 and Wind board 7 embodiments, the apparatus embodiment may also be adapted for installation on large vehicles such as city trucks and buses for capturing the frequent stop and go inertia of such large vehicles during acceleration and deceleration to be converted to electricity.

Although the invention has been explained in relation to its preferred embodiment, it is to be understood that many other possible modifications and variations can be made without departing from the spirit and scope of the invention as hereinafter claimed.

What is claimed is:

1. A reciprocating motion energy conversion apparatus comprising:
    at least one shaft guide frame;
    at least one power generator;
    at least one rolling shaft;
    a stationary pivot axis bar;
    a supporting frame;
    a plurality of anchor supports;
    a fixed platform structure;
    each shaft guide frame comprising a shaft guide surface, a first guide frame end and a second guide frame end, the shaft guide surface being a top surface of the shaft guide frame;
    the shaft guide surface being connected between the first guide frame end and the second guide frame end;
    each rolling shaft being positioned on the shaft guide surface of at least one of the shaft guide frames between the first guide frame end and the second guide frame end, each rolling shaft being able to roll freely in both directions on the shaft guide surface of at least one shaft guide frame between the first guide frame end and the second guide frame end;
    each power generator comprising a first electric generator and a second electric generator;
    the first electric generator and the second electric generator each comprising a generator housing and an input shaft, the input shaft being concentrically connected to a rotor of the electric generator within an electrical stator inside the generator housing;
    the input shaft of the first electric generator being concentrically and directly coupled to a first axial end of an indicated rolling shaft;
    the input shaft of the second electric generator being concentrically and directly coupled to a second axial end of the indicated rolling shaft opposite the first electric generator;
    the generator housing and the electrical stator of each electric generator being angularly restrained against rotation about the input shaft;
    the shaft guide frames being connected to the stationary pivot axis bar by the supporting frame, the pivot axis bar being oriented laterally relative to the shaft guide surface;
    the pivot axis bar being secured to the fixed platform structure by the plurality of anchor supports, the shaft guide frames being able to rotate freely about the stationary pivot axis bar;
    each shaft guide frame comprising a first electric generator guide groove and a second electric generator guide groove;
    the first electric generator and the second electric generator each comprising at least one wheel;
    the first electric generator guide groove and the second electric generator guide groove of each shaft guide frame traversing from the first guide frame end to the second guide frame end on an underside of the shaft guide frame opposite the shaft guide surface;
    the first electric generator guide groove and the second electric generator guide groove of each shaft guide frame being positioned opposite each other about a longitudinal direction of the shaft guide frame;
    each wheel of the first electric generator being positioned into the first electric generator guide groove, each wheel of the first electric generator being able to roll along the first electric generator guide groove between the first guide frame end and the second guide frame end; and
    each wheel of the second electric generator being positioned into the second electric generator guide groove, each wheel of the second electric generator being able to roll along the second electric generator guide groove between the first guide frame end and the second guide frame end.

2. The reciprocating motion energy conversion apparatus as claimed in claim 1, wherein the reciprocating motion energy conversion apparatus is able to convert kinetic energy from ocean, sea waves, or stop and go motion of moving vehicles to electrical power.

3. The reciprocating motion energy conversion apparatus as claimed in claim 1 comprises:
    the shaft guide surface being longitudinally concave between the first guide frame end and the second guide frame end.

4. The reciprocating motion energy conversion apparatus as claimed in claim 1 comprises:
    an enclosure; and
    each shaft guide frame, each electric generator, and each rolling shaft being positioned within the enclosure.

5. The reciprocating motion energy conversion apparatus as claimed in claim 4 comprises:
    the enclosure being waterproof;
    the enclosure being pressurized with nitrogen gas; and
    the enclosure being buoyant.

6. The reciprocating motion energy conversion apparatus as claimed in claim 4 comprises:
    the at least one shaft guide frame being mounted within the enclosure.

7. The reciprocating motion energy conversion apparatus as claimed in claim 1 comprises:
    at least one shaft guide gear;
    each shaft guide frame further comprises a shaft guide groove;
    each shaft guide groove traversing into the shaft guide surface;
    each shaft guide groove traversing across the shaft guide surface from the first guide frame end to the second guide frame end;
    each rolling shaft being concentrically connected to one of the shaft guide gears; and
    each shaft guide gear being positioned within the shaft guide groove, wherein the shaft guide gear is able to roll between the first guide frame end and the second guide frame end within the shaft guide groove.

8. The reciprocating motion energy conversion apparatus as claimed in claim 7 comprises:
    each shaft guide groove being oriented along a longitudinal direction of one of the shaft guide frames, wherein the first guide frame end and the second guide frame end are positioned opposite each other along the longitudinal direction.

9. The reciprocating motion energy conversion apparatus as claimed in claim 1 comprises:
    each shaft guide frame further comprises a first shaft stopper and a second shaft stopper;
    the first shaft stopper and the second shaft stopper being positioned opposite each other on each shaft guide frame;
    the first shaft stopper being connected to the first guide frame end of the at least one shaft guide frame adjacent to the shaft guide surface; and the second shaft stopper being connected to the second guide frame end of the at least one shaft guide frame adjacent to the shaft guide surface.

10. The reciprocating motion energy conversion apparatus as claimed in claim 9 comprises:
the shaft guide surface comprises a first curved portion and a second curved portion, wherein the first curved portion and the second curved portion curve upwards adjacent to the first guide frame end and the second guide frame end;
the first curved portion being positioned adjacent to the first shaft stopper; and
the second curved portion being positioned adjacent to the second shaft stopper.

11. The reciprocating motion energy conversion apparatus as claimed in claim 9 comprises:
at least one first elastic shock absorber;
at least one second elastic shock absorber;
each of the first elastic shock absorbers being connected to the first shaft stopper adjacent to the shaft guide surface; and
each of the second elastic shock absorbers being connected to the second shaft stopper adjacent to the shaft guide surface.

12. The reciprocating motion energy conversion apparatus as claimed in claim 1 comprises:
each of the electric generators being electrically connected to at least one electrical energy receiving device.

13. The reciprocating motion energy conversion apparatus as claimed in claim 1 comprises:
each electric generator comprises a weighted portion; and
the weighted portion being connected to a lower portion of the generator housing, wherein the lower portion and the input shaft are separated from each other by a lever arm, and wherein the weighted portion restrains the generator housing in the level orientation by applying a torque to the generator housing due to the gravitational force of the weighted portion if the generator housing is not in the level orientation.

* * * * *